(12) United States Patent
Yum

(10) Patent No.: US 10,235,713 B2
(45) Date of Patent: *Mar. 19, 2019

(54) USER-WIDGET-BASED TRANSACTION SYSTEM

(71) Applicant: eBay Inc., San Jose, CA (US)

(72) Inventor: KyungChun Yum, Gyeyang-gu (KR)

(73) Assignee: eBay Inc., San Jose, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 14/980,648

(22) Filed: Dec. 28, 2015

(65) Prior Publication Data

US 2016/0117760 A1 Apr. 28, 2016

Related U.S. Application Data

(63) Continuation of application No. 12/829,978, filed on Jul. 2, 2010, now Pat. No. 9,223,476.

(51) Int. Cl.
| | |
|---|---|
| G06F 3/048 | (2013.01) |
| G06Q 30/06 | (2012.01) |
| G06F 3/0481 | (2013.01) |
| G06F 3/0484 | (2013.01) |
| G06F 3/0483 | (2013.01) |
| G06Q 30/08 | (2012.01) |
| H04L 29/08 | (2006.01) |

(52) U.S. Cl.
CPC ....... *G06Q 30/0641* (2013.01); *G06F 3/0481* (2013.01); *G06F 3/0483* (2013.01); *G06F 3/04842* (2013.01); *G06Q 30/0633* (2013.01); *G06Q 30/08* (2013.01); *H04L 67/02* (2013.01); *G06F 3/0484* (2013.01)

(58) Field of Classification Search
CPC ... G06F 3/0484; G06F 3/0481; G06F 3/04842
See application file for complete search history.

(56) References Cited

U.S. PATENT DOCUMENTS

| 7,240,022 | B1 * | 7/2007 | Bistriceanu | G06Q 30/02 705/14.19 |
|---|---|---|---|---|
| 9,223,476 | B2 | 12/2015 | Yum | |
| 2002/0035697 | A1 | 3/2002 | McCurdy et al. | |
| 2004/0125081 | A1 | 7/2004 | Hayakawa | |
| 2007/0044035 | A1 | 2/2007 | Amadio et al. | |
| 2007/0044039 | A1 | 2/2007 | Amadio et al. | |
| 2007/0118813 | A1 * | 5/2007 | Forstall | G06F 3/0486 715/805 |
| 2007/0266093 | A1 * | 11/2007 | Forstall | G06F 3/04817 709/204 |

(Continued)

FOREIGN PATENT DOCUMENTS

WO WO-2009063034 A2 5/2009

OTHER PUBLICATIONS

"U.S. Appl. No. 12/829,978, Examiner Interview Summary dated May 15, 2013", 3 pgs.

(Continued)

*Primary Examiner* — Tuyetlien T Tran
(74) *Attorney, Agent, or Firm* — Wolfe-SBMC

(57) ABSTRACT

A method and system are described to provide a user-widget-based transaction environment. In one example embodiment, an electronic magazine may be presented to a user device as a widget without using a browser. The electronic magazine may comprise two or more data pages. A user selection of at least one of the two or more data pages may be detected and then communicated from the user device across a network for further processing.

20 Claims, 6 Drawing Sheets

(56) References Cited

U.S. PATENT DOCUMENTS

| | | | | |
|---|---|---|---|---|
| 2008/0120670 | A1* | 5/2008 | Easton | H04N 7/173 725/115 |
| 2008/0300980 | A1* | 12/2008 | Benjamin | G06Q 30/00 705/14.73 |
| 2009/0007017 | A1 | 1/2009 | Anzures et al. | |
| 2009/0235149 | A1 | 9/2009 | Frohwein | |
| 2009/0287559 | A1 | 11/2009 | Chen et al. | |
| 2009/0288014 | A1 | 11/2009 | Fujioka | |
| 2009/0300146 | A1 | 12/2009 | Park et al. | |
| 2010/0071026 | A1 | 3/2010 | Poulsen et al. | |
| 2010/0169130 | A1* | 7/2010 | Fineman | G06Q 10/02 705/5 |
| 2010/0257474 | A1* | 10/2010 | Bochatay | G06F 9/451 715/769 |
| 2011/0209057 | A1* | 8/2011 | Hinckley | G06F 1/1641 715/702 |
| 2012/0005585 | A1 | 1/2012 | Yum | |

OTHER PUBLICATIONS

"U.S. Appl. No. 12/829,978, Final Office Action dated Dec. 31, 2012", 11 pgs.

"U.S. Appl. No. 12/829,978, Non Final Office Action dated Jan. 23, 2015", 13 pgs.

"U.S. Appl. No. 12/829,978, Non Final Office Action dated Aug. 22, 2012", 10 pgs.

"U.S. Appl. No. 12/829,978, Notice of Allowance dated Aug. 28, 2015", 10 pgs.

"U.S. Appl. No. 12/829,978, Response filed Apr. 30, 2013 to Final Office Action dated Dec. 31, 2012", 11 pgs.

"U.S. Appl. No. 12/829,978, Response filed Jun. 23, 2015 to Non Final Office Action dated Jan. 23, 2015", 14 pgs.

"U.S. Appl. No. 12/829,978, Response filed Nov. 21, 2012 to Non Final Office Action dated Aug. 22, 2012", 10 pgs.

"Bench and Bar of Minnesota", [Online]. Retrieved from the Internet: <URL: http://mnbenchbar-digital.com/mnbenchbar/201004?pg=1>, (Apr. 2010), 2-3.

"WeatherBug Installation", [Online]. Retrieved from the Internet: <URL: http://ww2.weatherbug.com>, (Accessed Aug. 11, 2010), 1 pg.

"WeatherBug Screenshots", [Online]. Retrieved from the Internet: <URL: http://www.softpedia.com/progScreenshots/AWS-WeatherBug-Screenshot-1301.html>, (Accessed Aug. 11, 2010), 3 pgs.

"What is Ding?", [Online]. Retrieved from the Internet: <URL: http://www.southwest.com/ding/>, (Accessed Aug. 11, 2010), 1 pg.

* cited by examiner

USER-WIDGET-BASED TRANSACTION SYSTEM

PRIORITY

A This application is a continuation of and claims the benefit of priority to U.S. patent application Ser. No. 12/829,978, filed on Jul. 2, 2010, which is hereby incorporated by reference herein in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright© 2010, eBay Inc. All Rights Reserved.

TECHNICAL FIELD

This application relates to the technical fields of software and/or hardware technology and, in one example embodiment, to an online transaction system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Typically, an online transaction system (e.g., online transaction platform engine 134 of FIG. 1) communicates with a user device (e.g., desktops, mobile phones, personal digital assistants (PDAs) or home-networked devices, etc.) via a browser-based user interface (UI) (also referred to as a web browser or merely a browser). However, users of web browsers have experienced some usability problems because of clumsy interfacing and limited functionality that the web browser provides for online transaction (e.g., shopping). Web-based applications have been used as embedded within the web browser to ease the above-mentioned problems.

BRIEF DESCRIPTION OF DRAWINGS

Embodiments of the present invention are illustrated by way of example and not limitation in the FIG.s of the accompanying drawings, in which like reference numbers indicate similar elements and in which.

DETAILED DESCRIPTION

Figure 1:
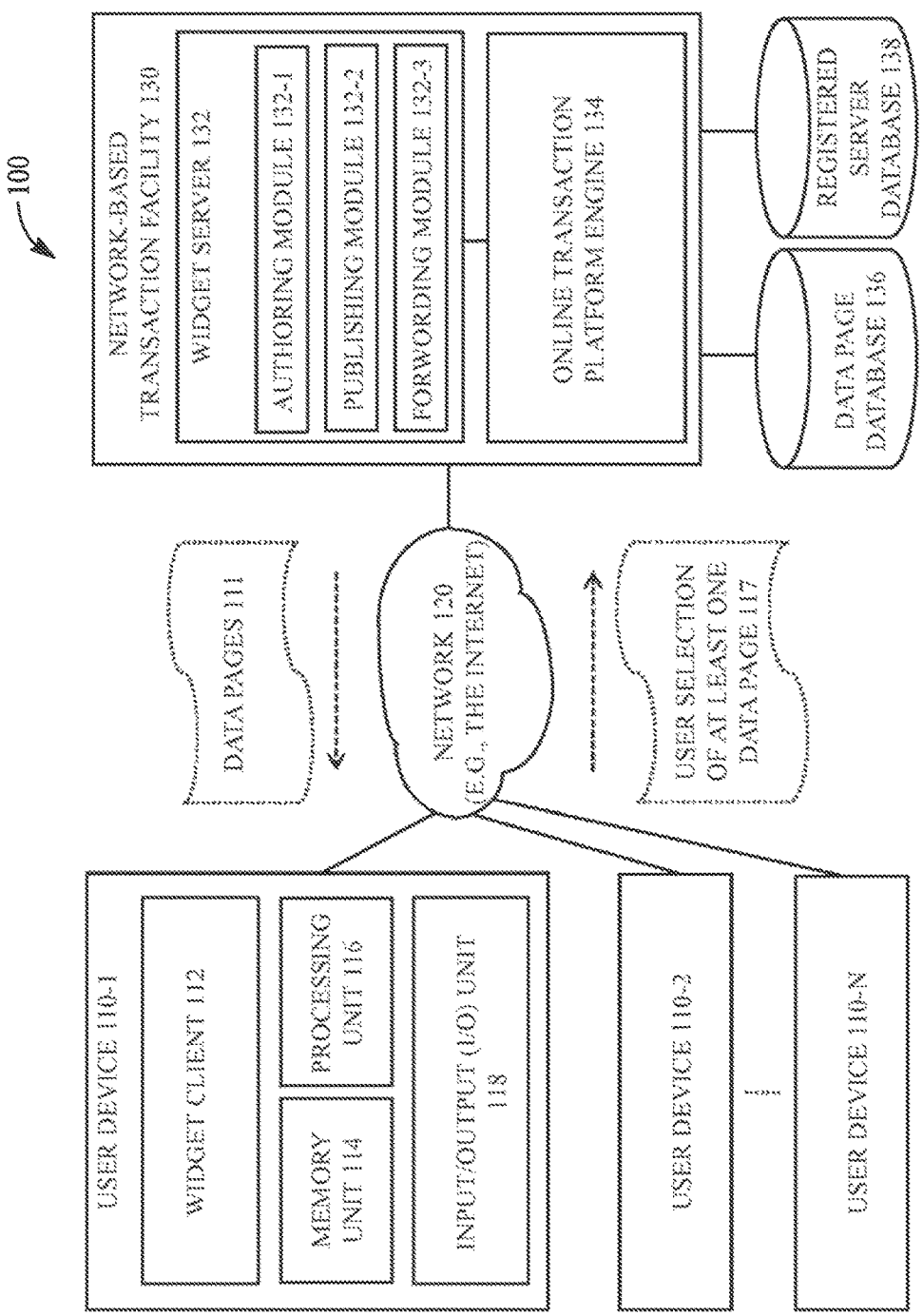
FIG. 1 is a diagrammatic representation of an architecture within which one example embodiment of a user-widget-based transaction system may be implemented.

In the following description, for purposes of explanation, numerous specific details are set forth in order to provide a thorough understanding of an embodiment of the present invention. It will be evident, however, to one skilled in the art that the present invention may be practiced without these specific details.

Existing browser-based (or web-based) online transaction techniques are bound by some fundamental limitations of a web browser. The users always have to activate the web browser and wait for a network connection to be established between the web browser and the online transaction system. In addition, the web browser receives updated contents of a particular listing from the online transaction system only after the users select the particular listing they are interested in, and not when the users select a data page that includes the particular listing. In some cases, waiting for these steps can take long enough to turn the users away from online transaction (e.g., shopping). This is especially true when the need for the online transaction is instantaneous rather than preplanned and/or a user is concurrently working on another task using his device.

Furthermore, under the existing browser-based online transaction techniques, data pages that each include one or more listings are constrained within a rectangular page provided by the web browser. For example, as known to those in the art, a 'web widget' is typically embedded on a web page as a rectangle section to demarcate different logical pieces of information on the web page. Also, the way the data pages are presented to the users is also limited by computational capability, or available resources of the web browser, which are usually inferior to those of a widget-based application. This results in a monotonous and less interactive way of interfacing between the users and the data pages that include listings, which in many cases also discourages the users from online transactions. A new method and system is introduced to resolve these problems and other additional problems that may be inherently or explicitly disclosed by a further reading of this documentation.

A method and system is described to provide a user-widget-based transaction environment. In one example embodiment, an electronic magazine may be presented as a widget via a user device without using a browser. The electronic magazine may comprise two or more data pages. A user selection of at least one of the two or more data pages may be detected and then communicated from the user device across a network for further processing. In one example embodiment, a network connection may be established between the user device and a network-based transaction facility without activating the browser via a widget-based user interface (UI) configured on the user device. This enables the one or more data pages to be displayed via the user device before the browser is activated on the user device.

In one example embodiment, the at least one data page may comprise at least one listing associated with an item or a service. The at least one listing may contain various types of information (e.g., texts, pictures or multimedia files, etc.) associated with the item or the service. The item or the service may be for commercial transactions (e.g., fixed-price or auction sale, etc.) or non-commercial transactions (e.g., sending inquires or posting information, etc.). In one example embodiment, the user selection of the at least one data page may comprise an order, an inquiry, a reservation, a bid or a trade request for the item or the service.

In one example embodiment, the electronic magazine may comprise an electronic book, an electronic newspaper, an electronic catalogue, an electronic brochure, or an electronic pamphlet or leaflet, etc. The electronic magazine may contain commercial or non-commercial information or both. In one example embodiment, the electronic magazine may be displayed via the user device in the form of a stand-alone window application program, and not an internet browser plug-in. More detailed explanation about the user-widget-based transaction system and method is given below with reference to FIGS. 1-5.

FIG. 1 is a diagrammatic representation of an architecture 100 within which one example embodiment of a user-widget-based transaction system may be implemented. As shown in FIG. 1, the architecture 100 may include one or more user devices 110-1, 110-2 and 110-N, in communication with a network-based transaction facility 130 via a network 120. Each of the user devices 110-1 through 110-N may comprise a stand-alone client computer system, a cell phone, a PDA or a home-networked television set, or so forth that may include a widget client 112, a memory unit 114, a processing unit 116 and an input/output (I/O) unit 118, such as a touch-screen or a normal display. The network-based transaction facility 130 may comprise a widget server 132 and an online transaction platform engine 134. In one example embodiment, at least one of a data page database 136 and a registered server database 138 may be locally or remotely coupled to the network-based transaction facility 130.

The widget client 112 may be downloaded from the network-based transaction facility 130 and installed on a corresponding user device, for example, user device 110-1. The widget client 112 may be initially set to perform according to default configurations provided by the network-based transaction facility 130. The default configuration may be changed later according to requirements of a respective user associated with the corresponding user device. The widget client 112 may communicate various information between the network-based transaction facility 130 and the user devices 110-1 through 110-N. For example, the widget client 112 installed on the user device 110-1 may receive a plurality of data pages 111 from the network-based transaction facility 130 via the network 120.

In one example embodiment, the data pages 111 may be transmitted from the network-based transaction facility 130 in the form of a markup language, such as HTML (HyperText Markup Language), XML (Extensible Markup Language) or SGML (Standard Generalized Markup Language), etc. Each of the data pages 111 may be associated with a corresponding page number and comprise at least one listing. The at least one listing may contain various types of information associated with an item or a service listed for transaction, such as a fixed-price sale, an auction or a request for further information, etc. For example, each data page may include text (e.g., a title, a category and a description, etc.) and picture and/or multimedia files associated with a corresponding item or service. At least one of the data pages 111 received from the network-based transaction facility 130 may further include advertisement information not directly related to a corresponding listing included in the data page. In one example embodiment, the data pages 111 may be stored in the memory unit 114 when they are received from the network-based transaction facility 130, and retrieved later by the widget client 112 for display.

The widget client 112 may present an electronic magazine including two or more of the data pages 111 via the I/O unit (e.g., the touch-screen display or the normal display) of the user device 110-1 and detect a user selection of at least one data page 117 from the two or more data pages presented. The widget client 112 may then transfer the user selection of the at least one data page 117 across the network 120. In one example embodiment, the widget client 112 may transfer the user selection of the at least one data page 117 to the network-based transaction facility 130 or to a user server (e.g., a merchant or seller server) (not shown) separate from the network-based transaction facility 130 depending on whether a destination address associated with the user selection is registered with the network-based transaction facility 130. More detailed structures and functions of the widget client 112 will be discussed below with reference to FIGS. 2 and 3.

The network 120 may provide a communication channel between the user devices 110-1 through 110-N and the network-based transaction facility 130. In one example embodiment, the network 120 may comprise a public network (e.g., the Internet, a wireless network, etc.) or a private network (e.g., a local area network (LAN), a wide area network (WAN), Intranet, etc.). The network 120 may use a transfer protocol, for example, Hypertext Transfer Protocol (HTTP), Hypertext Transfer Protocol Secure (HTTPs), or file transfer protocol (FTP), and so forth to transfer the data pages 111 and other information between the network-based transaction facility 130 and the user devices 110-1 through 110-N, or among the user devices 110-1 through 110-N.

The widget server 132 may be configured to manage (e.g., compose, publish, update, etc.) the data pages 111. The widget server 132 may also be configured to receive the user selection of the at least one data page 117 transferred from the widget client 112 and to process the user selection. In one example embodiment, the widget server 132 may comprise an authoring module 132-1, a publishing module 132-2 and a forwarding module 132-3.

The authoring module 132-1 may automatically compose the data pages 111 in an Internet compatible format, such as HTML, XML or SGML, and so forth, using corresponding listings received from users. In one example embodiment, the composed data pages may be stored in the data page database 136 and retrieved for later use. In one example embodiment, the listings used in the composed data pages may be retrieved from a listing database (not shown) separate from the data page database 136, and yet operatively coupled to the network-based transaction facility 130. In one example embodiment, the authoring module 132-1 may compose the data pages 111 in response to detection of corresponding listings being listed with the network-based transaction facility 130 (e.g., the online transaction platform engine 134), on a specified event basis (e.g., a number of newly listed listings reaching one hundred), or a specified time basis (e.g., every hour, day or week, etc.).

When the data pages 111 are composed, the publishing module 132-2 may transfer the data pages 111 to the user device, for example 110-1, via the widget client 112. The publishing module 132-2 may further monitor the data pages 111 in the network-based transaction facility 130 to detect any updates, such as changes in contents, removals of listings, and so forth. When the updates are detected, the publishing module 132-2 may push updated contents of corresponding data pages to the user device 110-1 via the widget client 112. The push by the publishing module 132-2 of the updated contents to the user device 110-1 may be performed periodically and/or upon occurrence of a special event specified by the network-based transaction facility 130 or a user associated with the user device 110-1. In one example embodiment, alternatively or additionally, the widget client 112 may access the widget server 132, periodically or upon occurrence of a specified event, check for data updates for the data pages 111 and download the updated contents for the data pages 111 from the network-based transaction facility 130.

The forwarding module 132-3 may receive the user selection of the at least one data page 117 transferred from the user device 110-1 via the network 120. The forwarding module 132-3 may then verify whether a destination address associated with the user selection of the at least one data page 117 is registered with the network-based transaction facility 130. If it is determined that the destination address is not registered with the network-based transaction facility 130, the forwarding module 132-3 may send an error notification to the user device 110-1.

If it is verified that the destination address is registered with the network-based transaction facility 130, the forwarding module 132-3 may further determine whether the destination address is an address of the network-based transaction facility 130 or an address of a separate server. The separate server may comprise, for example, an additional server run by, or affiliated with, the network-based transaction facility 130 or a user server (e.g., a server of a merchant, a seller, or a user who lists the at least one listing, etc.).

If the destination address is determined to be the address of the network-based transaction facility 130, then the forwarding module 132-3 may perform tasks requested by the user selection of the at least one data page 117, or notify a relevant functional entity (e.g., online transaction platform engine 134) of receipt of the user selection. If the destination address is determined to be the address of the separate server, then the forwarding module 132-3 may forward the user selection of the at least one data page 117 to the separate server for the requested tasks. In one example embodiment, the forwarding module 132-3 may receive an outcome of performing the requested tasks (e.g., updated bid or checkout information) from the separate server and forward it back to the user device 110-1.

In one example embodiment, the network-based transaction facility 130 may further comprise the registered server database 138 to store network addresses of registered servers, such as servers of sellers, merchants or users who list listings, or servers run by, or affiliated with, the network-based transaction facility 130. At least a portion of the network addresses stored in the registered server database 138 may be updated and downloaded to the user device 110-1 via the widget client 112, periodically or upon occurrence of a specified event. In one example embodiment, the downloaded registered server addresses may be stored in the memory unit 114, for example, in the form of a registered server repository (FIG. 2, block 290) for later use.

In one example embodiment, the forwarding module 132-3 may provide the user devices 110-1 through 110-N notifications of a specified event via the corresponding widget client 112. For example, the forwarding module 132-3 may send at least one of the user devices 110-1 through 110-N a message about a surprise sale, such as "50% sale on all brands of golf clubs between 3:00-4:00 PM today for the first 500 customers." The message may be automatically presented via the widget client 112 to the I/O unit (e.g., a display) 118 of the corresponding user devices 110-1 through 110-N, allowing respective users to be informed of the surprise sale without activating a web browser.

In one example embodiment, the online transaction platform engine 134 may provide the network-based transaction facility 130 with server-side functionality for a network-based marketplace (not shown in FIG. 1). For this purpose, the online transaction platform engine 134 may run a number of modules or applications, such as a listing module, a search module or a billing module (not shown in FIG. 1). For example, the listing module may provide a user (e.g., a merchant, a seller, an information provider, etc.) with capability to post data pages including corresponding listings via a user device associated with the user. The search module may provide access to existing listings associated with the network-based transaction facility 130 according to user queries. The billing module may provide the network-based transaction facility 130 with capabilities to bill users according to various services provided to the users.

It is noted that although only three modules are described herein, more or less modules may run on each of the widget server 132 and the online transaction platform engine 134 in one example embodiment. It is also noted that although the online transaction platform engine 134 is described as an entity separate from the widget server 132, they may be combined as a single entity or divided into more entities, and yet provide the same functionality in one example embodiment.

Figure 2:
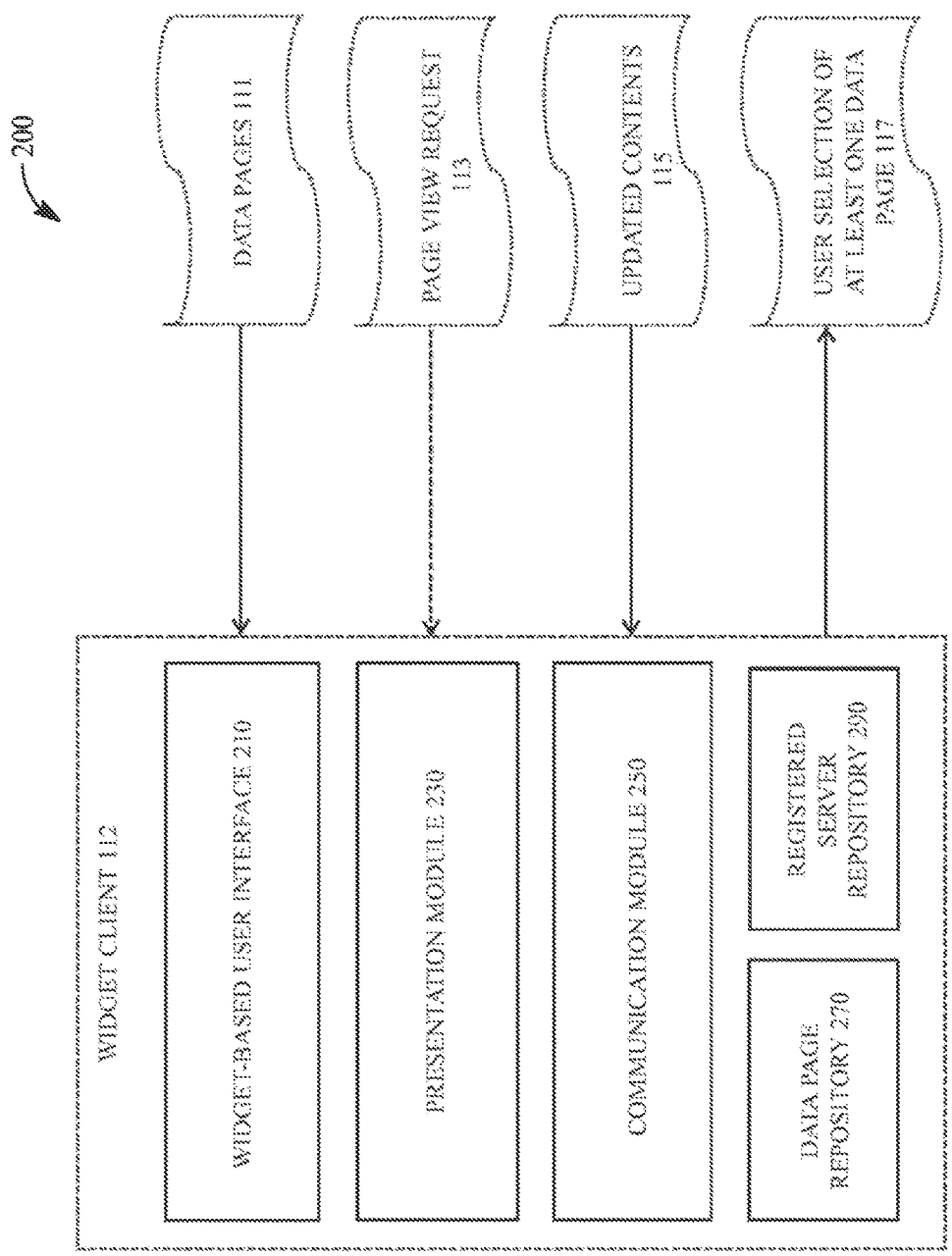
FIG. 2 is block diagram of a widget client of a user-widget-based transaction system, in accordance with one example embodiment.

FIG. 2 is a block diagram 200 of a widget client of the user-widget-based transaction system, in accordance with one example embodiment. The widget client may be designed to imitate user experiences similar to when a user flips through a paper magazine, book, newspaper, brochure or catalog, etc., giving an impression of turning pages or turning a page half way. Accordingly, a user of the widget client may be presented with graphics that show the bending or folding of one or more data pages, allowing a half-turned page to extend beyond the rectangular presentation area.

As shown in FIG. 2, the widget client 112 may comprise a widget-based user interface (UI) 210, a presentation module 230, and a communication module 250. In one example embodiment, the widget client 112 may further comprise a plurality of repositories including a data page repository 270 and a registered server repository 290. At least one of the data page repository 270 and the registered server repository 290 may be stored in a local memory associated with a corresponding user device, such as the memory unit 114 in FIG. 1.

In one example embodiment, the widget-based UI 210 may be configured to establish a network connection with a server, such as the network-based transaction facility 130 in FIG. 1, without activating a web browser. This enables two or more of a plurality of data pages 111 received from the network-based transaction facility 130 to be simultaneously presented to a corresponding user device (e.g., 110-1 in FIG. 1) without using the web browser once the widget-based UI 210 is installed on the user device. In one example embodiment, the widget-based UI 210 installed on the user device 110-1 may communicate with at least one of other widget clients running on other user devices 110-2 through 110-N, directly or via the network-based transaction facility 130.

The widget-based UI 210 may be downloaded to the user device 110-1 from the network-based transaction facility 130. In one example embodiment, the widget-based UI 210 may be distributed to the user device 110-1 offline in the form of a computer-readable storage medium, such as a compact disc read-only memory (CD-ROM), a memory stick, and so forth. The widget-based UI 210 may then be installed on the user device 110-1 for operation.

In one example, the widget-based UI 210 may initially receive the plurality of data pages 111 from the network-based transaction facility 130 according to a user configuration or a system configuration when installed on the user device 110-1. For example, the plurality of data pages 111 initially received from the network-based transaction facility 130 may be associated with a certain designated category, such as ladies fashion, golf, and so forth. Alternatively or additionally, other search requirements (e.g., brands), parameters (e.g., price ranges) or subcategories (e.g., iron or driver, etc.) may be applied to initially select the plurality of data pages 111 from the network-based transaction facility 130. The user configuration or the system configuration for the widget-based UI 210 may be changed later during operation, for example, in response to a user request or a specified event.

The presentation module 230 may present an electronic magazine to the user device 110-1 as a widget via the widget-based UI 210 without using a web browser. The electronic magazine may comprise two or more of the data pages 111 transmitted from the network-based transaction facility 130. In one example embodiment, the presentation module 230 may provide at least one of the data pages 111 with interface functionalities that are not available in conventional web browsers (e.g., Explorer or Firefox, etc.) or web browser based applications (e.g., web widgets, etc.) embedded in the conventional web browsers. For example, the presentation module 230 may automatically render images of the at least one of the data pages 111 using information received from the network-based transaction facility 130. In one example embodiment, as noted earlier, the information for the corresponding data page may comprise HTML, XML, or SGML documents.

Figure 4A:
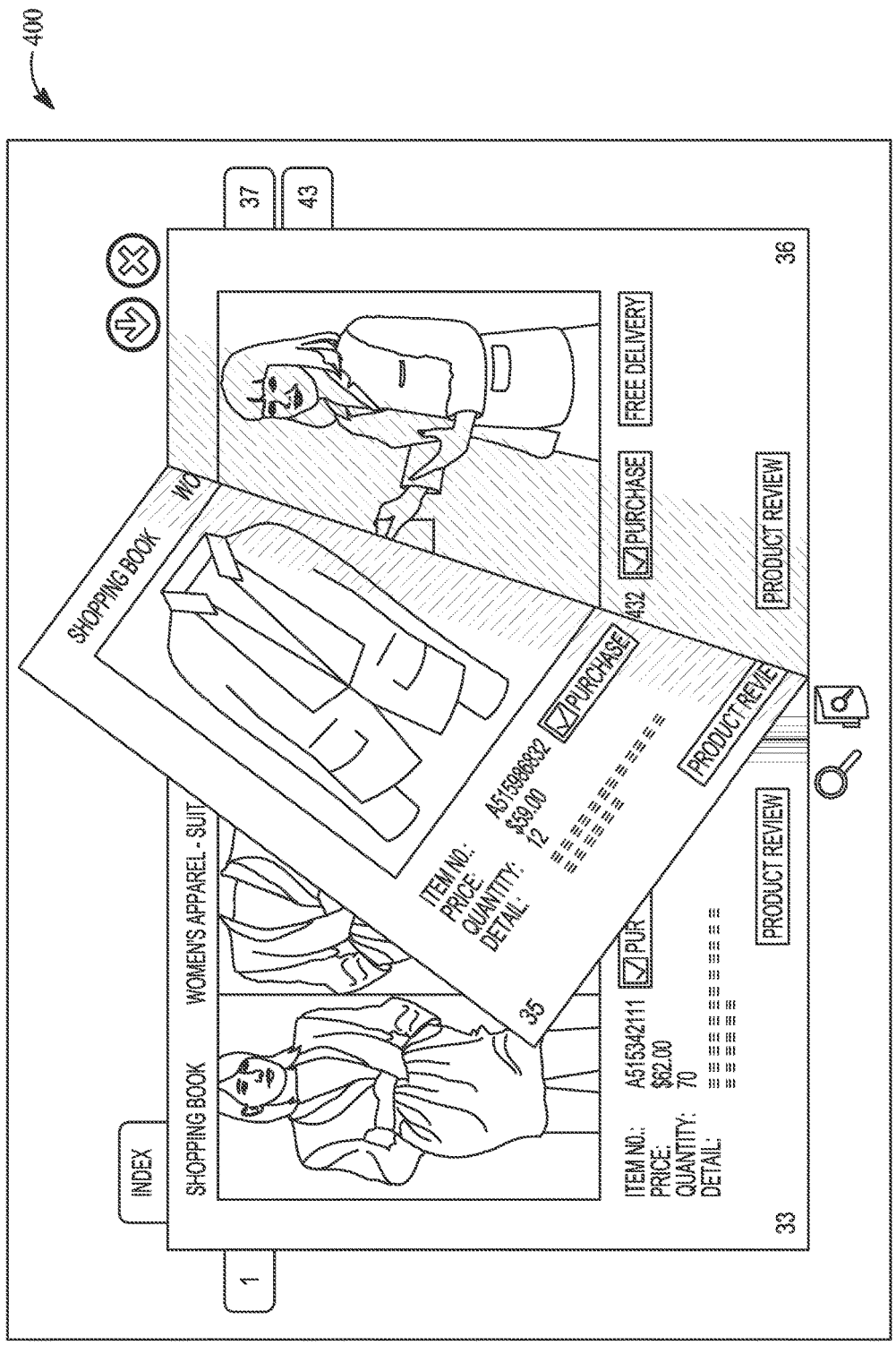
FIGS. 4A and 4B are snapshots of a widget client displaying a plurality of data pages simultaneously, in accordance with one example embodiment.
Figure 4B:
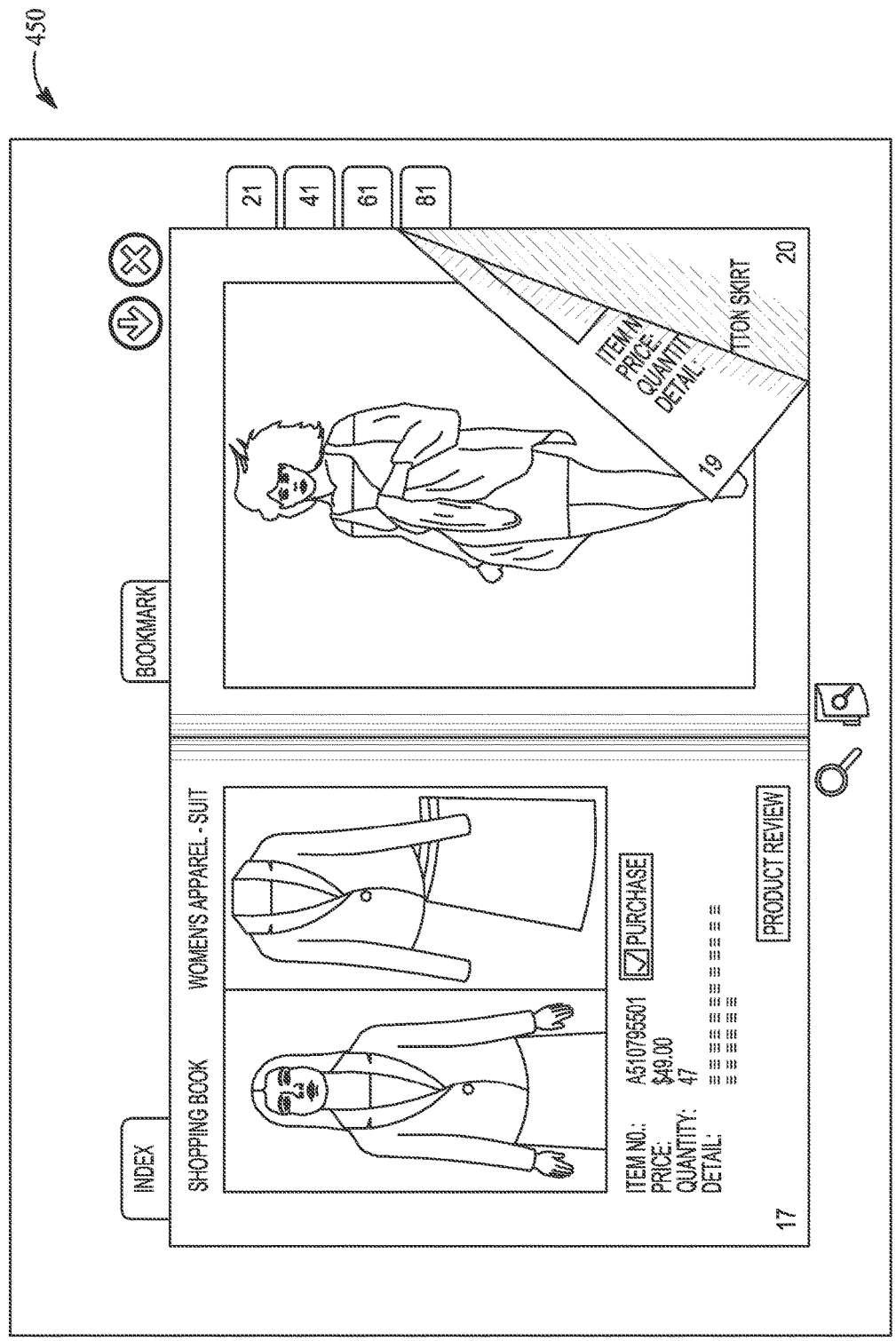

In one example embodiment, the presentation module 230 may display at least one of the two or more data pages 111 as being distorted from its original shape by, for example, folding, bending, extending a portion of the at least one data page over a boundary line of other data pages or partially overlapping the at least one page with the other data pages, as illustrated in FIGS. 4A and 4B.

In one example embodiment, the presentation module 230 may simultaneously display contents of two discontinuous data pages (e.g., pages 33 and 35) without displaying the contents of the intervening data page (e.g., page 34), as illustrated by the snapshot 400 in FIG. 4A. In one example embodiment, the presentation module 230 may simultaneously display the contents of two data pages that are more than two pages apart from each other (e.g., pages 33 and 37) without displaying the contents of a plurality of intervening data pages (e.g., pages 34-36) when two or more of the intervening data pages (e.g., pages 35 and 36) are folded or bended so as to substantially overlap with each other.

In yet another example embodiment, the presentation module 230 may simultaneously display portions of both a front side and a back side (e.g., pages 18 and 19) of the at least one data page being distorted (e.g., page 18), as illustrated by the snapshot 450 in FIG. 4B. In one example embodiment, alternatively or additionally, the shape of the data page being distorted may be changed from a rectangular shape to a non-rectangular shape and/or the size of the data page being distorted may be enlarged or reduced from its original size. In one example embodiment, as illustrated in FIGS. 4A and 4B, the presentation module 230 may display shadows for the data page being distorted. The shapes and sizes of the shadows may be changed responsive to the movement of the data page being distorted.

In one example embodiment, the presentation module 230 may retrieve one or more data pages presented via the widget-based UI 210 from the local memory (e.g., the memory unit 114) associated with the user device 110-1 upon activation of the widget-based UI 210. The widget-based UI 210 may be automatically activated upon a power-on of the user device 110-1, or by user activation separate from the power-on of the user device 110-1. In one example embodiment, the presentation module 230 may receive at least one portion of contents for the one or more data pages from the network-based transaction facility 130 in real-time instead of retrieving from the local memory (e.g., the memory unit 114). In one example embodiment, the presentation module 230 may temporarily save the at least one portion of the contents in a cache memory (not shown) of the user device 110-1 before presenting it via the widget-based UI 210.

In one example embodiment, the presentation module 230 may access, periodically or upon occurrence of a specified event, the network-based transaction facility 130 (e.g., the widget server 132) to check updates for the data pages that are stored in the local memory and/or currently presented via the widget-based UI 210. In response to detection of the updates, the presentation module 230 may download updated contents 115 for corresponding data pages from the network-based transaction facility 130. In one example embodiment, one or more new or initial configuration requirements (e.g., date ranges, price ranges, brands, etc.) configured by a corresponding user may be applied in receiving the updated contents 115 from the network-based transaction facility 130.

In one example embodiment, the widget client 112 may perform the task of receiving updated and/or new data pages from the network-based transaction facility 130 as a back-end processing while the widget-based UI 210 is not actively used, such as idly sitting as an icon on a task bar of a window of the user device 110-1. In such a case, the updated and/or new data pages received from the network-based transaction facility 130 may be stored in the local memory (e.g., the memory unit 114) and retrieved therefrom later for display when requested.

In one example embodiment, two or more data pages that are to be presented to the user device 110-1 via the widget-based UI 210 may include a first data page and a second data page. The first data page may include a first listing and the second data page may include a second listing. When a page view request 113 for the first data page is detected via the widget-based UI 210, the presentation module 230 may update not only the first listing but also the second listing for display with latest information at a substantially same time and vice versa.

The presentation module 230 may replace an electronic magazine that is presented via the widget-based UI 210 with a new electronic magazine. In one example embodiment, the presentation module 230 may replace the two or more data pages presented to the user device 110-1 via the widget-based UI 210 with new data pages. All of the new data pages may be associated with a same category that is different from any of one or more categories associated with the one or more data pages presented via the widget-based UI 210. In one example embodiment, the presentation module 230 may activate two or more instances of the widget-based UI 210 concurrently. In such a case, a respective one of the two or more user widget instances may be used to display a group of data pages associated with a corresponding same item or service category and/or same display requirements.

The presentation module 230 may simulate a page turn-over. The page turn-over may comprise visually presenting a switch from an electronic data page to another in a manner that resembles the turning over of a page of a paper magazine. In one example embodiment, the presentation module 230 may turn over a selected data page toward a neighboring data page in response to a request for a page turn-over. In one example embodiment, the presentation module 230 may turn over the selected data page, starting from a user-specified portion of the selected data page. The user-specified portion may be determined by a user input received via the I/O unit 118, such as a touch screen, a mouse input, and so forth.

In one example embodiment, the presentation module 230 may change a speed of the turning over the data page. For example, the presentation module 230 may speed up or slow down a page turn-over movement responsive to the speed of the user input. In one example embodiment, the presentation module 230 may pause the page turn-over before the selected data page is completely turned over to the neighboring data page. In one example embodiment, the presentation module 230 may further move the selected data page that is paused during the page turn-over in any direction, forward or backward. For example, the presentation module 230 may resume turning over the paused data page toward the neighboring data page or move the paused data page back toward its original position. In one example embodiment, the presentation module 230 may pause and resume the page turn-over repeatedly.

In one example embodiment, the presentation module 230 may calculate changes in a location and/or a size of a portion of the selected data page that is turned over (e.g., folded or bended). The presentation module 230 may then update corresponding data contents of a target data page (e.g., new data page) being displayed in the turned-over portion based on the changes. In one example embodiment, the presentation module 230 may determine, from the selected data page, a first portion that is not turned over and a second portion that is turned over. The presentation module 230 may then display contents of the selected data page on the non-turned-over portion and contents of a rear-side page of the selected data page on the turned-over portion at the same time.

In one example embodiment, the presentation module 230 may partially overlap the paused data page with other data pages, resulting in a first portion of the other data pages hidden from view and a second portion of the other data pages displayed at the same time. In one example embodiment, the presentation module 230 may be configured to present one or more menu buttons to receive a user control of the one or more data pages. The one or more menu buttons may be displayed as being located outside of a boundary line of the widget-based UI 210 or protruding from the boundary line toward the outside.

The communication module 250 may be configured to detect a user selection of at least one data page 117 from the data pages presented via the widget-based UI 210. The communication module 250 may then transfer the user selection from the user device 110-1 across the network 120 for further processing. More detailed operations of the communication module 250 will be explained below with reference to FIG. 3.

Although the presentation module 230 and the communication module 250 are described above as residing on a user device, such as 110-1, along with the widget-based UI 210, in one example embodiment, at least one of the presentation module 230 and the communication module 250 may be configured to run on the network-based transaction facility 130, alternatively or additionally.

It is noted that each of the modules described above in FIGS. 1 and 2 may be implemented by hardware (e.g., circuit), firmware, software or any combinations thereof. It is also noted that although each of the modules is described above as a separate module, the entire modules or some of the modules in FIGS. 1 and 2 may be implemented as a single entity (e.g., module or circuit) and still maintain the same functionality. Example operations performed by the widget client 118 and the widget server 132 are discussed below with reference to FIG. 3.

Figure 3:
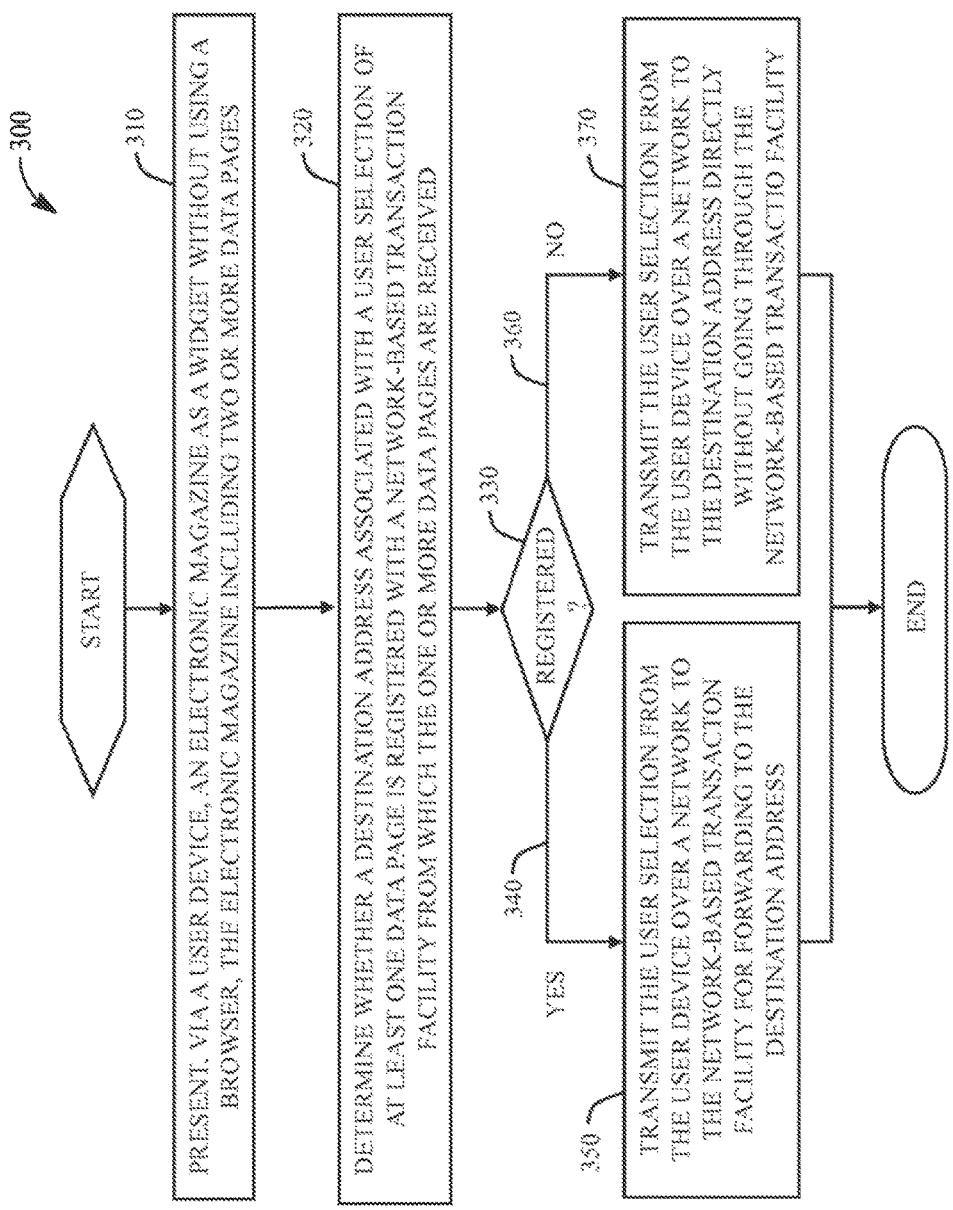
FIG. 3 is a flow chart of a method for using a user-widget-based transaction system, in accordance with one example embodiment.

FIG. 3 is a flow chart of a method for using the user-widget-based transaction system, in accordance with one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic may reside in various modules illustrated in FIG. 1 and FIG. 2. It should be noted that the activities described herein may be executed in an order other than the order described. The various activities described with respect to the methods identified herein may also be executed in repetitive, serial, and/or parallel fashion.

As shown in FIG. 3, at operation 310, an electronic magazine may be presented to a user device (e.g., 110-1) via a widget-based UI (e.g., 210) without using a browser. The electronic magazine may comprise two or more data pages (e.g., 111). At least one of the two or more data pages may include at least one listing associated with an item or a service for a commercial or non-commercial transaction. At operations 320, 330, 340, 350, 360 and 370, a user selection of the at least one data page (e.g., 117) detected via the widget-based UI 210 may then be communicated from the user device 110-1 across a network (e.g., 120) for further processing. For example, the communication module 250 in FIG. 2 may communicate the user selection from the user device 110-1 across the network 120.

In one example embodiment, when the user selection of the at least one data page 117 is detected via the widget-based UI 210, it may be determined, at operations 320 and 330, whether a destination address associated with the user selection is registered with a network-based transaction facility (e.g., 130) from which the two or more data pages 111 or the widget-based UI 210 are downloaded. In one example embodiment, a registered server repository (e.g., 138) that is generated from the network-based transaction facility 130 may be scanned to find an address that matches the destination address associated with the user selection. The registered server repository 138 may include one or more addresses of corresponding one or more servers that are registered to the network-based transaction facility 130. The one or more registered servers may be servers run by users (e.g., merchants, sellers or ones who list the listings), or servers run by, or affiliated with, the network-transaction facility 130.

At operation 340, if it is determined that the destination address is registered with the network-based transaction facility 130 (e.g., a match is found in the registered server repository), then, at operation 350, the user selection may be transmitted from the user device 110-1 via the network 120 to the network-based transaction facility 130 for further processing. The network-based transaction facility 130 may then forward the user selection to the destination address if the destination address does not match its own network address. For example, the forwarding module 132-3 of the widget server 132 may forward the user selection to a server run by, or affiliated with, the network-based transaction facility 130 or to a user server (e.g., a merchant server or a computer of a user who lists the at least one listing). Or, if the destination address matches its own network address, the network-based transaction facility 130 (e.g., the online transaction platform engine 134) may perform a requested transaction associated with the user selection.

At operation 360, if it is determined that the destination address is not registered with the network-based transaction facility 130 (e.g., no match is found in the registered server repository), then, at operation 370, the user selection may be transmitted from the user device 110-1 via the network 120 directly to the destination address without going through the network-based transaction facility 130. In one example embodiment, a web browser may be activated on the user device 110-1 to transmit the user selection to its destination address.

In one example embodiment, the two or more data pages that are presented to the user device 110-1 via the widget-based UI 210 may include a first data page and a second data page. The first data page may include a first listing and the second data page may include including a second listing. When a page view request (e.g., 113) for the first data page is detected via the widget-based UI 210, not only the first listing but also the second listing may be updated for display with latest information at a substantially same time and vice versa.

In one example embodiment, the electronic magazine that is presented to the user device (e.g., 110-1) via the widget-based UI 210 may be replaced with a new electronic magazine. In such a case, the two or more data pages included in the electronic magazine may be replaced with new data pages. In one example embodiment, all of the new data pages may be associated with a same category that is different from any of one or more categories associated with the one or more data pages. In one example embodiment, two or more instances of the widget-based UI 210 may be activated concurrently. In such a case, a respective one of the two or more user widget instances may be used to display a group of data pages associated with a corresponding same item or service category and/or same display requirements.

One or more data pages presented to the user device 110-1 may be controlled by a user input via the widget-based UI 210. In one example embodiment, a data page may be selected from the two or more data pages in response to a first user input identified via the user widget 120. The selected data page may then be turned over toward its neighboring data page, revealing at least one portion of a rear-side page of the selected data page or a neighboring page of the rear-side page. In one example embodiment, a turning portion may be additionally selected from the selected data page in response to a second user input identified via the widget-based UI 210. Then, the page turn-over of the selected data page may start from the user-specified turning portion (e.g., upper corner or lower corner, etc.) of the selected data page. In one example embodiment, the speed of a page turn-over of the selected data page may be changed (e.g., slower or faster) in response to a third user input (e.g., the speed of dragging a mouse pointer, etc.). In one example embodiment, the page turn-over of the selected data page may be paused before the selected data page is completely turned over to the target data page. In one example embodiment, the selected data page that is paused during the page turn-over may be moved back to its original position before the page turn-over started.

In one example embodiment, at least a portion of the selected data page that is being turned over may be displayed as folded, bended, extending over a boundary line of non-selected data pages or partially overlapping with the non-selected data pages. In one example embodiment, one or more menu buttons may be presented to receive a user control of the one or more data pages. The one or more menu buttons may be displayed as being located outside of a boundary line of the widget-based UI 210 or protruding from the boundary line toward the outside. Other variations of page turn-over movement may be further provided.

In one example embodiment, functionalities to present an electronic magazine including two or more data pages to the user device 110-1 and to communicate the user selection across the network 120 may be configured to run on the user device 110-1 along with the widget-based UI 210. In yet another example embodiment, alternatively or additionally, at least one of the functionalities described above may be configured to run on the network-based transaction facility 130 (e.g., widget server 132) or its affiliated server(s).

The user-widget-based transaction system and method described herein allow utilizing more computational capacity of a user device (e.g., 110-1) than the conventional web-browser based online transaction systems and methods may do. This allows providing a user with real like experiences of turning a page or flipping through multiple pages of a paper magazine, catalogue, book, newspaper or brochure. This in turn results in, among other things, reduced time and enhanced interface (e.g., display) functionalities for users to view electronic data pages, ultimately attracting more users to online transactions.

Example Database

Some example embodiments may include various databases (e.g., the data page database 136) being relational databases or, in some example cases, On Line Analytic Processing (OLAP)-based databases. In the case of relational databases, various tables of data are created and data is inserted into, and/or selected from, these tables using Structured Query Language (SQL) or some other database-query language known in the art. In the case of OLAP databases, one or more multi-dimensional cubes or hypercubes containing multidimensional data from which data is selected or into which data is inserted using Multidimensional Expressions (MDX) may be implemented. In the case of a database using tables and SQL, a database application such as, for example, MySQL™, SQLServer™, Oracle 8I™, 10G™, or some other suitable database application, may be used to manage the data. Here, in the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables or cubes made up of tables, in the case of, for example, ROLAP, are organized into a Relational Data Schema (RDS) or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free from application processing. Further, a second tier may be a logic tier that performs application processing in the form of logical/mathematical manipulations of data inputted through the interface level, and that communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer-to-peer, or some other suitable configuration. Further, these three tiers may be distributed between more than one computer system as various software components.

Component Design

Some example embodiments may include the above illustrated tiers and the processes or operations that make them up, as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), JavaBeans (JB), Enterprise JavaBeans (EJB), JavaScript, Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls used to implement one or more of the above-illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above-illustrated object-oriented programming techniques and can be written in the same programming language or a different programming language. Various protocols may be implemented to enable these components to communicate regardless of the programming language used to write these components. For example, a component written in C++ may be able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model or Transmission Control Protocol/Internet Protocol (TCP/IP) protocol stack model for defining the protocols used by a network to transmit data.

A System of Transmission Between a Server and Client

Some example embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, a LAN, a WAN, or some other suitable network. In some example cases, "Internet" refers to a network of networks. These networks may use a variety of protocols for the exchange of data, including the aforementioned TCP/IP, and additionally Asynchronous Transfer Mode (ATM), Systems Network Architecture (SNA), or some other suitable protocol. These networks may be organized within a variety of topologies (e.g., a star topology) or structures.

A Computer System

Figure 5:
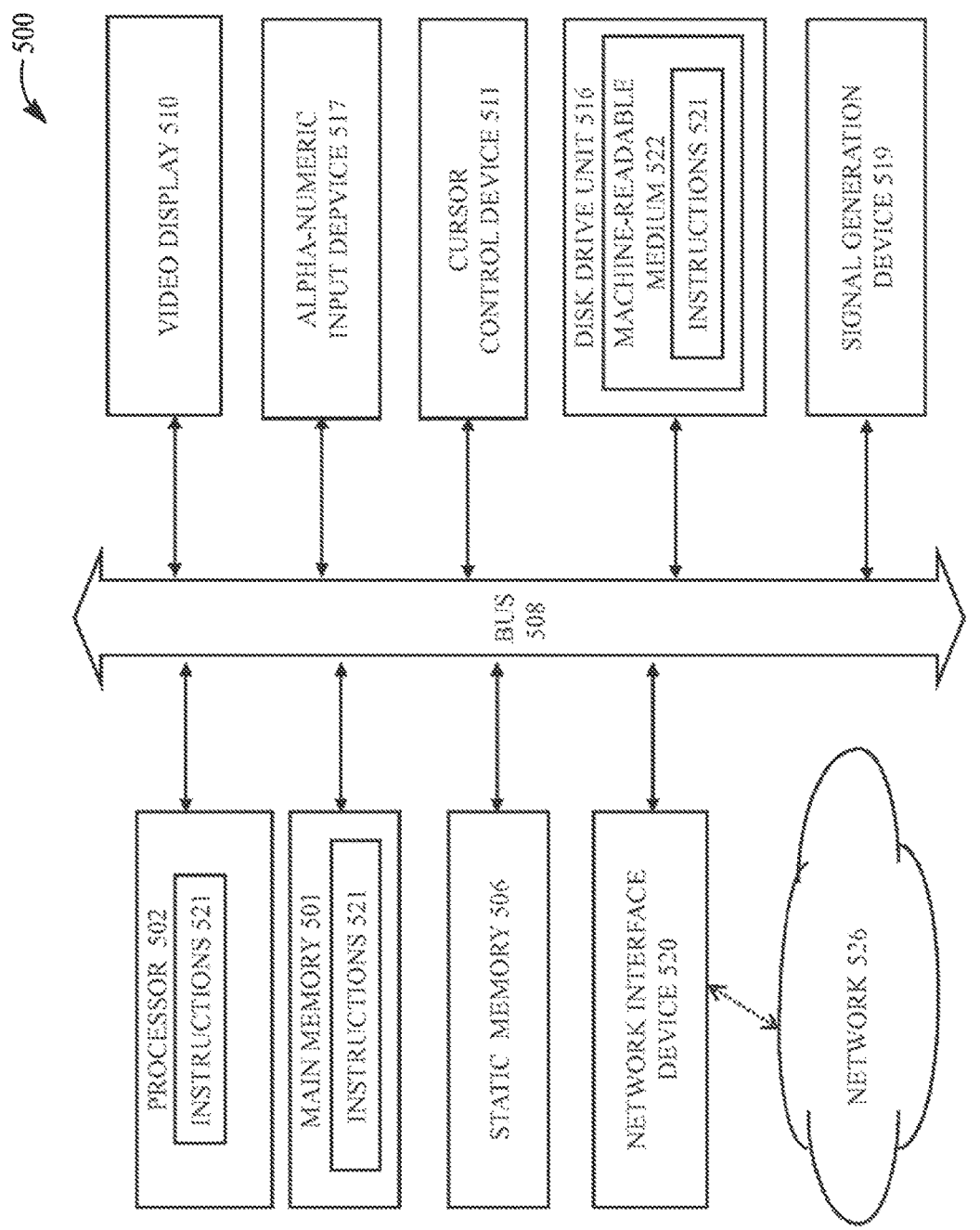
FIG. 5 is a diagrammatic representation of an example machine in the form of a computer system within which a set of instructions, for causing the machine to perform any one or more of the methodologies discussed herein, may be executed.

FIG. 5 shows a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processor 502 (e.g., a central processing unit (CPU), a graphics processing unit (GPU) or both), a main memory 501 and a static memory 506, which communicate with each other via a bus 508. The computer system 500 may further include a video display unit 510 (e.g., a liquid crystal display (LCD) or a cathode ray tube (CRT), etc.). The computer system 500 also includes an alpha-numeric input device 517 (e.g., a keyboard), a UI navigation device (e.g., a cursor control device 511), a disk drive unit 516, a signal generation device 519 (e.g., a speaker) and a network interface device 520. The disk drive unit 516 includes a machine-readable medium 522 on which is stored one or more sets of instructions 521 and data structures (e.g., software) embodying or utilized by any one or more of the methodologies or functions described herein. The instructions 521 and data structures may also reside, completely or at least partially, within the main memory 501 and/or within the processor 502 during execution thereof by the computer system 500, with the main memory 501 and the processor 502 also constituting machine-readable media. The instructions 521 and data structures may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Marketplace Applications

A method and system is described to provide a user-widget-based transaction environment. In one example embodiment, an electronic magazine may be presented via a user device as a widget without using a browser. The electronic magazine may comprise two or more data pages. A user selection of at least one of the two or more data pages may be detected and then communicated from the user device across a network for further processing.

Additional Notes

The above "DETAILED DESCRIPTION" includes references to the accompanying drawings, which form a part of the "DETAILED DESCRIPTION." The drawings show, by way of illustration, how specific embodiments of the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Example Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Example Embodiments, with each claim standing on its own as a separate embodiment.

What is claimed is:

1. A device comprising:
   at least one processor and executable instructions accessible on a non-transitory computer-readable storage medium that, when executed, cause the processor to perform operations comprising:
   presenting, at the device, one or more data pages of an electronic magazine via a widget on the device without using a browser, at least some data pages of the one or more data pages received from a network-based transaction facility;
   receiving, at the device, a selection of one of the one or more data pages;

determining whether a destination address associated with the selected one of the one or more data pages is registered with the network-based transaction facility; and responsive to determining that the destination address is not registered with the network-based transaction facility, transmitting the selection from the device to the destination address directly without going through the network-based transaction facility.

2. The device of claim 1, wherein the operations further comprise establishing a network connection via a widget-based user interface (UI) without activating the browser.

3. The device of claim 1, wherein the operations further comprise:

responsive to determining that the destination address is registered with the network-based transaction facility, transmitting the selection from the device to the network-based transaction facility.

4. The device of claim 1, wherein the operations further comprise visually presenting, at the device, a switch between the one or more data pages by visually turning over at least one of the one or more data pages toward a neighboring data page in response to a request for a page turn-over.

5. The device of claim 4, wherein the operations further comprise starting the page turn-over of the at least one of the one or more data pages from a user-specified portion of the one of the one or more data pages.

6. The device of claim 4, wherein the operations further comprise changing a speed of the page turn-over of the at least one of the one or more data pages.

7. The device of claim 4, wherein the operations further comprise pausing the at least one of the one or more data pages during the page turn-over.

8. The device of claim 4, wherein the operations further comprise displaying at least a portion of the at least one of the one or more data pages as folded, bent, or partially overlapping with one or more non-selected data pages of the one or more data pages.

9. The device of claim 4, wherein the operations further comprise:

determining, in the at least one of the one or more data pages, a first portion that is not turned over and a second portion that is turned over; and displaying contents of the at least one of the one or more data pages on the first portion and contents of a rear-side page of the at least one of the one or more data pages on the second portion simultaneously.

10. A computer-implemented method, comprising:

presenting, at a device, one or more data pages of an electronic magazine via a widget on the device without using a browser, at least some data pages of the one or more data pages received from a network-based transaction facility;

receiving, at the device, a selection of one of the one or more data pages;

determining whether a destination address associated with the selected one of the one or more data pages is registered with the network-based transaction facility; and responsive to determining that the destination address is not registered with the network-based transaction facility, transmitting the selection from the device to the destination address directly without going through the network-based transaction facility.

11. The computer-implemented method of claim 10, wherein the presenting comprises establishing a network connection via a widget-based user interface (UI) without activating the browser.

12. The computer-implemented method of claim 10, wherein the presenting comprises visually presenting a switch between the one or more pages by visually turning over at least one of the one or more data pages toward a neighboring data page in response to a request for a page turn-over.

13. The computer-implemented method of claim 12, wherein the turning over includes pausing the at least one of the one or more data pages during the page turn-over.

14. The computer-implemented method of claim 12, wherein the turning over comprises displaying at least a portion of the at least one of the one or more data pages as folded, bent or partially overlapping with one or more non-selected data pages of the one or more data pages.

15. The computer-implemented method of claim 12, wherein the turning over comprises:

determining, in the at least one of the one or more data pages, a first portion that is not turned over and a second portion that is turned over; and displaying contents of the at least one of the one or more data pages on the first portion and contents of a rear-side page of the at least one of the one or more data pages on the second portion simultaneously.

16. The computer-implemented method of claim 11, further comprising:

responsive to determining that the destination address is registered with the network-based transaction facility, transmitting the selection to the network-based transaction facility.

17. A non-transitory computer-readable storage medium storing instructions, that, when executed by a processor, cause the processor to perform operations, comprising:

presenting, at a device, one or more data pages of an electronic magazine via a widget on the device without using a browser, at least some data pages of the one or more data pages received from a network-based transaction facility;

receiving, at the device, a selection of one of the one or more data pages;

determining whether a destination address associated with the selected one of the one or more data pages is registered with the network-based transaction facility; and responsive to determining that the destination address is not registered with the network-based transaction facility, transmitting the selection from the device to the destination address directly without going through the network-based transaction facility.

18. The non-transitory computer-readable storage medium of claim 17, wherein the selection comprises input associated with placing an order for an item available for purchase.

19. The non-transitory computer-readable storage medium of claim 17, wherein the selection comprises input associated with bidding for an item available for purchase.

20. The non-transitory computer-readable storage medium of claim 17, wherein the operations further comprise:

responsive to determining that the destination address is registered with the network-based transaction facility, transmitting the selection from the device to the network-based transaction facility.

\* \* \* \* \*